(12) United States Patent
Chang et al.

(10) Patent No.: US 7,574,774 B2
(45) Date of Patent: Aug. 18, 2009

(54) HINGE UNIT WITH AUTO-LOCK AND DOUBLE-SIDE ROTATION

(75) Inventors: Jung-Wen Chang, Tao Yuan Shien (TW); Chun-Feng Lai, Sanchung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 308 days.

(21) Appl. No.: 11/700,021

(22) Filed: Jan. 31, 2007

(65) Prior Publication Data

US 2008/0034550 A1 Feb. 14, 2008

(30) Foreign Application Priority Data

Jun. 23, 2006 (TW) .............................. 95211072 U (51) Int. Cl.
*E05D 3/10* (2006.01)
(52) U.S. Cl. .......................................... 16/367; 16/337
(58) Field of Classification Search .................. 16/367, 16/371, 369, 325, 337, 340, 374; 361/681, 361/683
See application file for complete search history.

(56) References Cited

U.S. PATENT DOCUMENTS

| | | | | |
|---|---|---|---|---|
| 5,419,013 A | * | 5/1995 | Hsiao | 16/319 |
| 5,651,536 A | * | 7/1997 | Daul | 267/205 |
| 6,233,785 B1 | * | 5/2001 | Tanahashi | 16/337 |
| 6,464,052 B1 | * | 10/2002 | Hsiao | 188/290 |
| 6,804,861 B2 | * | 10/2004 | Hsu | 16/366 |
| 7,017,235 B2 | * | 3/2006 | Lu et al. | 16/367 |
| 7,055,218 B2 | * | 6/2006 | Lu et al. | 16/367 |
| 7,222,396 B2 | * | 5/2007 | Lu et al. | 16/340 |
| 7,275,626 B2 | * | 10/2007 | Fukuzawa et al. | 188/296 |
| 7,336,782 B2 | * | 2/2008 | Watanabe et al. | 379/433.13 |
| 7,346,960 B2 | * | 3/2008 | Higano et al. | 16/367 |
| 7,469,449 B2 | * | 12/2008 | Hsu | 16/367 |
| 2003/0140451 A1 | * | 7/2003 | Bivens et al. | 16/54 |
| 2004/0139578 A1 | * | 7/2004 | Yang et al. | 16/337 |
| 2005/0091796 A1 | * | 5/2005 | Lu et al. | 16/337 |
| 2006/0123593 A1 | * | 6/2006 | Shiba | 16/325 |
| 2007/0174997 A1 | * | 8/2007 | Lu et al. | 16/367 |

* cited by examiner

*Primary Examiner*—Robert J Sandy
*Assistant Examiner*—Rowland D Do
(74) *Attorney, Agent, or Firm*—Rabin & Berdo, PC (57) ABSTRACT

A hinge unit applicable on a computer device provides an auto-lock and double-side rotation function comprising a brace, a first pivoting member, a second pivoting member, a post and a connecting sheet. The hinge unit further comprises a positioning member and an angle limiter for providing the functions of positioning and fit-in feeling.

18 Claims, 6 Drawing Sheets

HINGE UNIT WITH AUTO-LOCK AND DOUBLE-SIDE ROTATION

RELATED APPLICATIONS

The present application is based on, and claims priority from, Taiwan Application Serial Number 95211072, filed Jun. 23, 2006, the disclosure of which is hereby incorporated by reference herein in its entirety.

BACKGROUND

1. Field of Invention

The present invention relates to a hinge unit. More particularly, the present invention relates to an auto-lock hinge unit.

2. Description of Related Art

Figure 1:
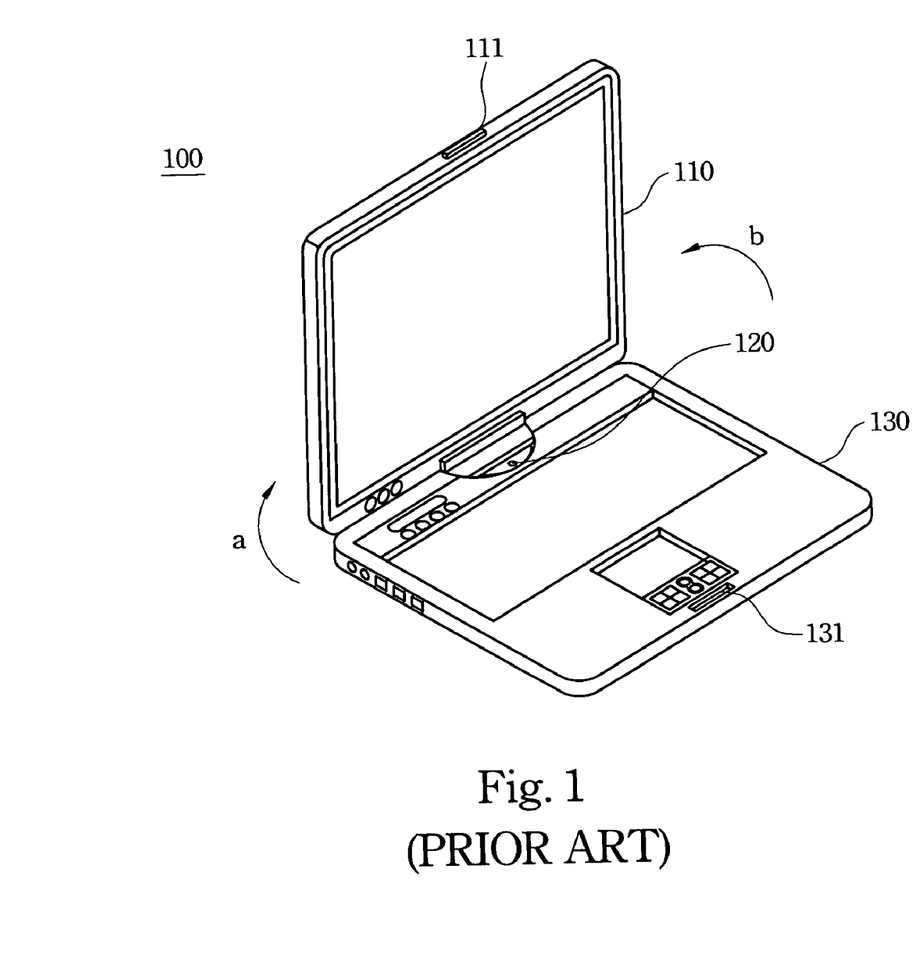
FIG. 1 is a schematic diagram of a conventional table PC.

Convertible tablet PCs (personal computer) integrate a normal notebook and tablet PC in a shell. FIG. 1 is a schematic diagram of a conventional convertible tablet PC. The convertible tablet PC 100 comprises a display unit 110, a base 130, a hinge unit 120 and a fastener unit wherein the fastener unit secures the display unit 110 to the base 130. The fastener unit is a latch or includes both a mortice 131 and a tenon 111, An easy way to convert the convertible tablet PC 100 from one operating status (such as normal notebook) to another operating status (such as tablet PC) is to directly rotate the display unit 110 in a preset rotation direction a of 180 degrees and then push the display unit 110 down to cover the base 130. To convert the convertible tablet PC 100 back to its original operation status (normal notebook), a user inverses the steps above.

During the rotation operation, while rotating the display unit 110 180 degrees, the display unit 110 can only be rotated in one direction, clockwise or counterclockwise, depending on the hinge unit 120 (for the foregoing example, rotation direction a is allowed while rotation direction b is not allowed). In other words, when rotating the display unit 110, the user has to remember the preset rotation direction, either a or b, or the hinge unit 120 may be damaged.

SUMMARY

It is therefore an aspect of the present invention to provide a hinge unit with auto-lock and double-side rotation function. The hinge unit comprises a brace with a first side hole, a second side hole and a brace hole wherein both the first side hole and the second hole are set on both sides of the brace respectively, and the brace hole is set on the top of the brace; a first pivoting member with a first connecting portion at one end while the other end crosses through a first gasket, the first side hole, a first cam, a second cam, an elastomer, a second gasket is horizontally connected with a connecting member; a second pivoting member with a second connecting portion at one end while the other end crosses through the second side hole, a third gasket and is then horizontally connected with a fastener (for example, a screw); a connecting sheet with a sheet hole having a third connecting portion and a fourth connecting portion on both sides respectively; and a spindle with a post which crosses through a fourth gasket, an elastomer, the brace hole, a fifth gasket and the sheet hole vertically;

The hinge unit further comprises a rotation sheet and an angle limiter, the angle limiter is set above the brace hole of the brace and has a convex edge; the rotation sheet has a first convex and a second convex used to push the angle limiter once either the first convex or the second convex collide with the convex edge of the angle limiter. A first stop and a second stop are set nearby the brace hole used to stop the angle limiter from rotating with the rotation sheet wherein the angle between the first stop and the second stop is the limited angle.

The hinge unit still further comprises a positioning member set beneath the brace hole of the brace, the positioning member has a ring hole, a first protrusion and a second protrusion wherein the first protrusion and the second protrusion are set opposite to each other nearby the ring hole; a first dimple and a second dimple are disposed nearby the brace hole corresponding to the first protrusion and the second protrusion. Thus, while the hinge unit is rotating, the first protrusion and the second protrusion would fit in the first dimple and the second dimple respectively (or the second dimple or the first dimple respectively).

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 2:
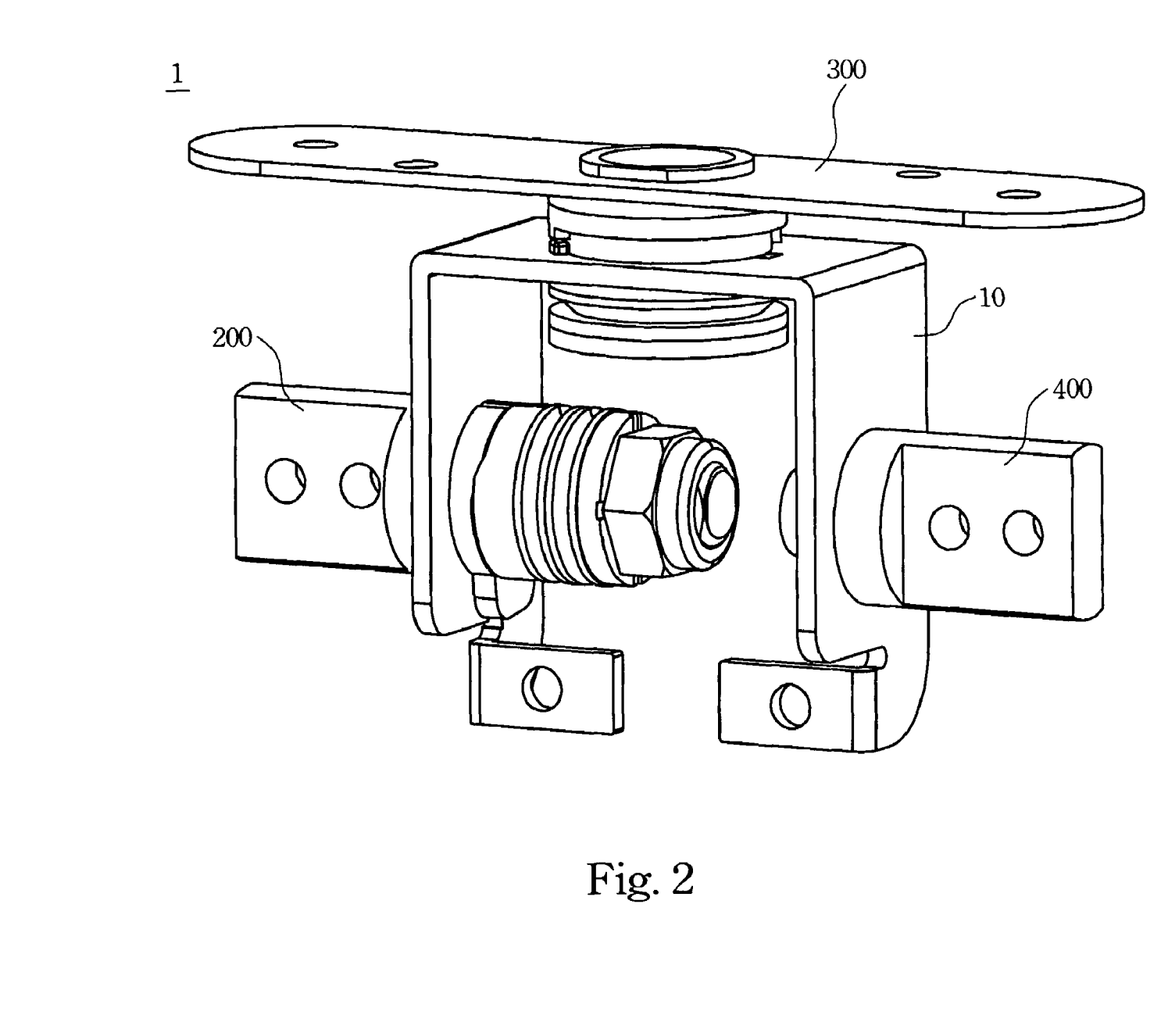
FIG. 2 is a schematic diagram of a hinge unit in accordance with a preferred embodiment of the present invention.

Refer to FIG. 2. FIG. 2 shows a schematic diagram of a hinge unit in accordance with a preferred embodiment of the present invention. The hinge unit 1 is applicable on a convertible tablet PC which includes a display unit and a base wherein the base is electronically connected to the display unit via the hinge unit 1. The display unit, for example, is a touch screen and the base is a server or a host. The hinge unit 1 comprises a brace 10, a first pivoting member 200, a second pivoting member 400 and a connecting sheet 300.

Figure 3:
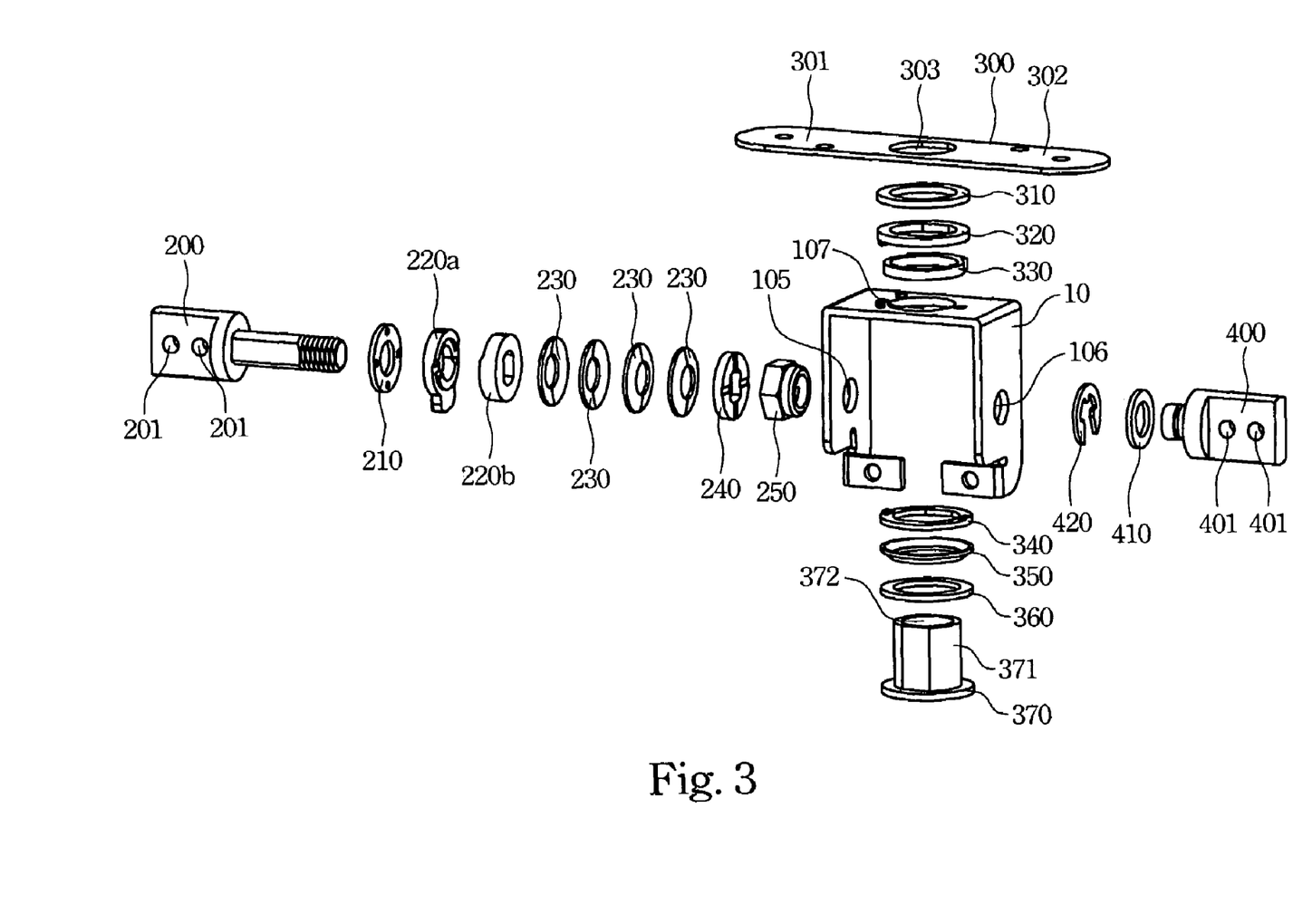
FIG. 3 is an exploded diagram of a hinge unit in accordance with a preferred embodiment of the present invention.

FIG. 3 shows an exploded diagram of the hinge unit 1. The ⊓-shaped brace 10 has a first side hole 105 and a second side hole 106 on both sides; and a brace hole 107 is set on the top of the brace 10. The first pivoting member 200 has a first connecting portion 201 on one end to connect with another device like the base of a computer device. The other end of the first connecting portion 201 crosses through a first gasket 210, the first side hole 105, a first cam 220a, a second cam 220b, an elastomer 230 (a spring, for example), a second gasket 240 and is then connected horizontally with a connecting member 250 (a screw, for example). The elastomer 230 is used to keep a display unit at a specific angle while the second gasket 240 functions as a buffer to absorb the friction between the elastomer 230 and the connecting member 250. The second pivoting member 400 has a second connecting portion 401 at one end to connect with another device like a base of a computer device. The other end of the second pivoting member 400 crosses through the second side hole 106, a third gasket 410 and is then connected with a fastener 420 (a C-ring, for example) horizontally. The third gasket 410 is used to buffer the friction between the fastener 420 and the second pivoting member 400. The connecting sheet 300 has a sheet hole 303, a third connecting portion 301 and a fourth connecting portion 302 wherein the third connecting portion 301 and the fourth connecting portion are disposed at each end of the connecting sheet 300 respectively for connecting with a display unit of a computer device. The spindle 370 has a post member 371 vertically crossing through a fourth gasket 360, an elastomer 350 (a spring, for example), a positioning member 340, the brace hole 107 of the brace 10, an angle limiter 330, a rotation sheet 320, a fifth gasket 310 and the sheet hole 303. The fourth gasket 360 is used to absorb the friction between the elastomer 350 and the spindle 370. Besides, the spindle 370 further comprises a post hole 372 by which the electronic wires or cables pass through.

Figure 4:
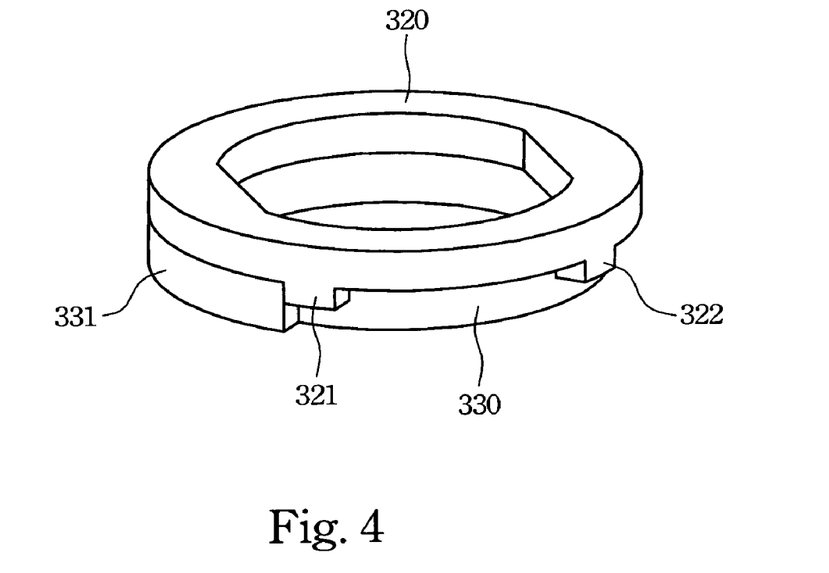
FIG. 4 shows an operation diagram between an angle limiter and a rotation sheet in accordance with a preferred embodiment of the present invention.

FIG. 4 shows the operation diagram between the angle limiter 330 and the rotation sheet 320. The rotation sheet 320 uses a first convex 321 (and a second convex 322) to push the angle limiter 330. The ring-shaped angle limiter 330 has a convex edge 331 at the bottom edge, thus, as soon as either the first convex 321 or the second convex 322 collide the convex edge 331, the rotation sheet 320 pushes the angle limiter 330 to rotate.

Figure 5:
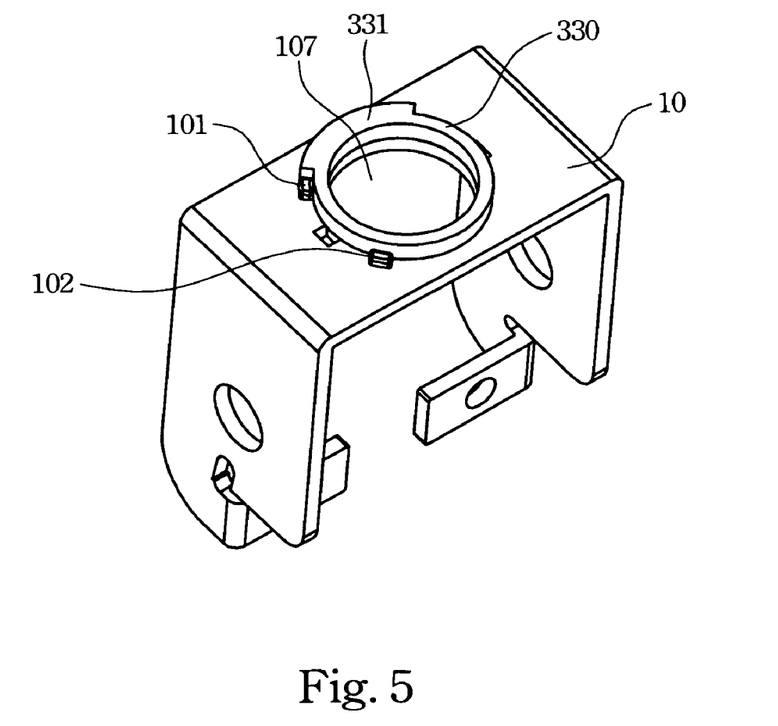
FIG. 5 shows an operation diagram between an angle limiter and a brace in accordance with a preferred embodiment of the present invention.

FIG. 5 shows the operation diagram between the angle limiter 330 and the brace 10. The brace hole 107 of the brace 10 has a first stop 101 and a second stop 102 at the edge. When the angle limiter 330 is rotated with the rotation sheet 320 (see the forgoing section), the convex edge 331 is stopped by the first stop 101 or the second stop 102, thus stopping the angle limiter 330 as well as the rotation sheet 320 from rotating where the angle between the first stop 101 and the second stop 102 is the limited angle which also makes the hinge unit 100 capable of double-side rotation.

Figure 6:
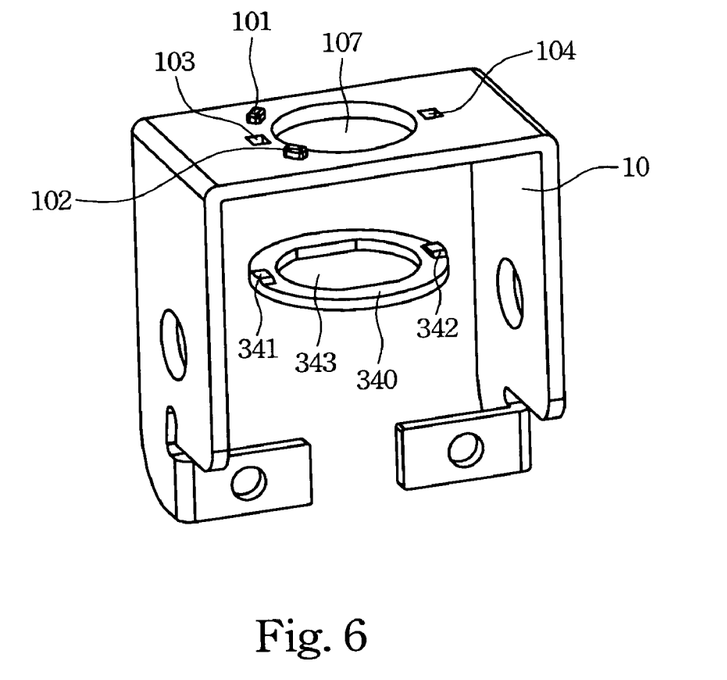
FIG. 6 shows an operation diagram of a positioning member and a brace in accordance with a preferred embodiment of the present invention.

FIG. 6 shows the operation diagram between the positioning member 340 and the brace 10. The positioning member 340 is used to make a fit-in feeling while rotating the hinge unit 1. The positioning member 340 has a first protrusion 341 and a second protrusion 342 whose positions are opposite to each other and being around a ring hole 343 of the positioning member 340 while the brace 10 has a first dimple 103 and a second dimple 104 corresponding to the first protrusion 341 and the second protrusion 342. Therefore, while the positioning member 340 rotates relative to the brace 10, the first protrusion 341 and the second protrusion 342 would fit into the first dimple 103 and the second dimple 104, respectively (or the second dimple 104 and the first dimple 103, respectively).

Figure 7A:
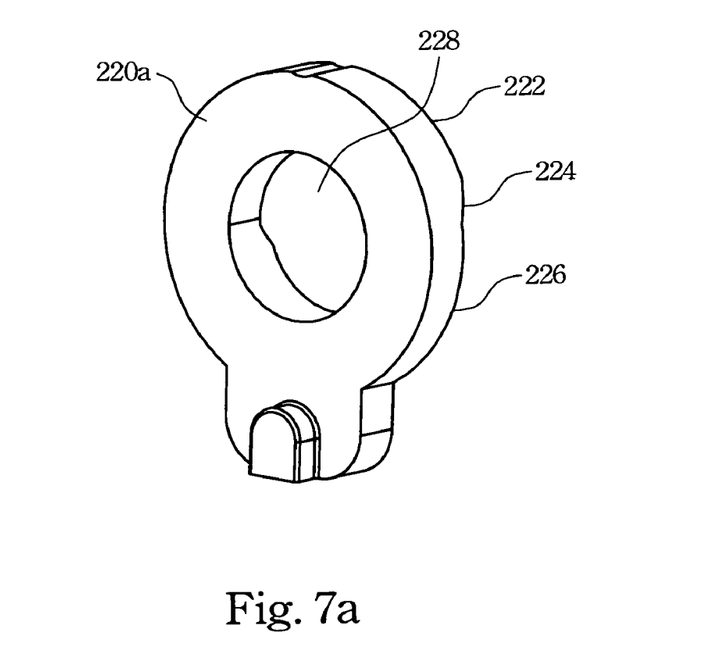
FIGS. 7a~7b is a schematic diagram of a cam in accordance with a preferred embodiment of the present invention.
Figure 7B:
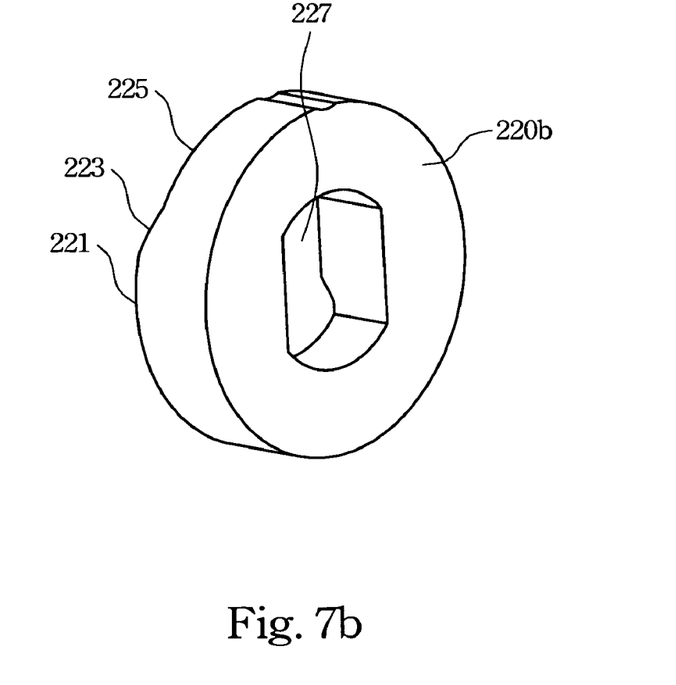

FIGS. 7a~7b shows schematic diagrams of two cams. In FIG. 7a, a first cam 220a is shown. The first cam 220a comprises a second height plane 222, a second low plane 226, a second ramp section 224 and a second cam hole 228. The second ramp section 224 is located between the second height plane 222 and the second low plane 226. In FIG. 7b, a second cam 220b is shown. The second cam 220b comprises a first height plane 221, a first low plane 225, a first ramp section 223 and a first cam hole 227. The first ramp section 223 is located between the first height plane 221 and the first low plane 225.

Figure 7C:
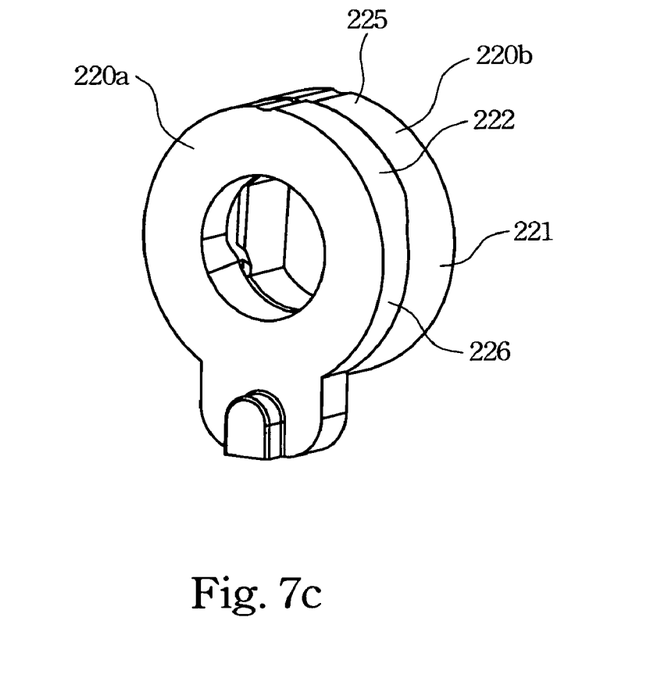
FIG. 7c shows an operation diagram of two cams in accordance with a preferred embodiment of the present invention

FIG. 7c shows the operation diagram between the first cam 220a and the second cam 220b. Because the mechanism of the height plane and the low plane, once the first height plane 221 (and the second height plane 222) move on the second ramp section 224 (at the same time, the second height plane 222 would move on the first ramp section 223), the second ramp section 224 would let the first height plane 221 slip to the second low plane 226 (and the first low plane 225) automatically; thus, providing auto-lock functions; in other words, a user only pushes the display unit down to let the angle between the display unit and the base be within a specific angle range instead of pushing the display unit to cover the base completely, the mechanism would let the display unit cover the base completely and automatically, therefore, a conventional latch for securing the display unit with the base is not required and thus saves cost.

From the foregoing description, the invention provides the advantages: 1. provides an auto-lock function 2. provides a double-side rotation 3. provides a fit-in function and 4. saves cost (conventional latch is not required).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge unit applicable on an electronic device, comprising:
   a brace with a first side hole, a second side hole, a brace hole, a first stop and a second stop, wherein both the first side hole and the second side hole are set on both sides of the brace respectively, the brace hole is set on the top of the brace, and the first stop and the second stop are set adjacent to the brace hole;
   a first pivoting member with a first connecting portion at one end while the other end thereof horizontally crosses through a first gasket, the first side hole, a first cam, a second cam, first elastomer, a second gasket and is fastened by a connecting member;
   a second pivoting member with a second connecting portion at one end while the other end thereof horizontally crosses through the second side hole, a third gasket and is fastened by a fastener;
   a connecting sheet set above the brace, having a third connecting portion and a fourth connecting portion on both sides respectively, and having a sheet hole aligned with the brace hole;
   a spindle with a post which crosses through a fourth gasket, second elastomer, the brace hole, a fifth gasket and the sheet hole vertically;
   an angle limiter set above the brace, and having a convex edge disposed on a sidewall thereof, and a first through hole aligned with the brace hole; and
   a rotation sheet set between the angle limiter and the fifth gasket, having a second through hole aligned with the brace hole, and a first convex and a second convex used to push the angle limiter when either the first convex or the second convex collides with the convex edge of the angle limiter;
   wherein the first connecting portion and the second connecting portion are connectable to a base of the electronic device; the third connecting portion and the fourth portion are connectable to a display unit of the electronic device, the first stop and the second stop are for stopping the angle limiter from rotating with the rotation sheet, and the angle between the first stop and the second stop is a limited angle of the angle limiter.

2. The hinge unit as claimed in claim 1, wherein a surface of the first cam facing to the second cam includes a second height plane,
a second low plane,
a second ramp section located between the second height plane and the second low plane, and
a second cam hole crossed through by the first pivoting member; and a surface of the second cam facing to the first cam includes
a first height plane,
a first low plane,
a first ramp section located between the first height plane and the first low plane, and
a first cam hole crossed through by the first pivoting member.

3. The hinge unit as claimed in claim 1, wherein the hinge unit further comprises a positioning member set beneath the brace hole of the brace, the positioning member having a ring hole, a first protrusion and a second protrusion wherein the first protrusion and the second protrusion are set opposite to each other nearby the ring hole; a first dimple and a second dimple are also disposed nearby the brace hole corresponding to the first protrusion and the second protrusion.

4. The hinge unit as claimed in claim 3, wherein the fastener is a c-ring.

5. The hinge unit as claimed in claim 3, wherein the spindle has a post hole.

6. The hinge unit as claimed in claim 3, wherein at least one of the first and second elastomers is a spring.

7. The hinge unit as claimed in claim 3, wherein the connecting member is a nut.

8. A computer device, comprising:
a display unit;
a base connected electronically with the display unit; and
a hinge unit, comprising
a brace with a first side hole, a second side hole, a brace hole, a first stop and a second stop, wherein both the first side hole and the second side hole are set on both sides of the brace respectively, the brace hole is set on the top of the brace, and the first stop and the second stop are set adjacent to the brace hole;
a first pivoting member with a first connecting portion on one end while the other end crossing through a first gasket, the first side hole, a first cam, a second cam, first elastomer, a second gasket and then be connected with a connecting member horizontally;
a second pivoting member with a second connecting portion at one end while the other end crosses through the second side hole, a third gasket and is then fastened by a fastener horizontally;
a connecting sheet with a sheet hole having a third connecting portion and a fourth connecting portion on both sides respectively;
a spindle with a post which crosses through a fourth gasket, second elastomer, the brace hole, a fifth gasket and the sheet hole vertically;
an angle limiter set above the brace, having a convex edge on a circular sidewall thereof, and a first through hole aligned with the brace hole; and
a rotation sheet set between the angle limiter and the fifth gasket, having a second through hole aligned with the brace hole, and a first convex and a second convex used for clipping the convex edge of the angle limiter;
wherein the first connecting portion and the second connecting portion are connectable to the base;
the third connecting portion and the fourth portion are connectable to the display unit; and
when the rotation sheet is rotated, the rotation sheet rotates the angle limiter until the convex edge touches the first stop or the second stop where the angle between the first stop and the second stop is a limited angle.

9. The computer device as claimed in claim 8, wherein a surface of the first cam facing to the second cam includes
a second height plane,
a second low plane,
a second ramp section located between the second height plane and the second low plane, and
a second cam hole crossed through by the first pivoting member; and a surface of the second cam facing to the first cam includes
a first height plane,
a first low plane,
a first ramp section located between the first height plane and the first low plane, and
a first cam hole crossed through by the first pivoting member.

10. The computer device as claimed in claim 8, wherein the hinge unit further comprises a positioning member set beneath the brace hole of the brace, the positioning member having a ring hole, a first protrusion and a second protrusion wherein the first protrusion and the second protrusion are set opposite to each other nearby the ring hole; besides, a first dimple and a second dimple are disposed nearby the brace hole corresponding to the first protrusion and the second protrusion.

11. The computer device as claimed in claim 10, wherein the fastener is a c-ring.

12. The computer device as claimed in claim 11, wherein the display unit is a touch screen.

13. The computer device as claimed in claim 10, wherein the spindle has a post hole.

14. The computer device as claimed in claim 10, wherein at least one of the first and second elastomers is a spring.

15. The computer device as claimed in claim 10, wherein the connecting member is a nut.

16. The computer device as claimed in claim 10, wherein the base is a host.

17. The computer device as claimed in claim 10, wherein the base is a server.

18. A hinge unit applicable on an electronic device, comprising:
a brace with a first side hole and a second side hole each set on a respective side of the brace, a brace hole set on a top of the brace, and first and second stops set adjacent to the brace hole;
a first pivoting member with a first connecting portion at one end, while the other end thereof horizontally crosses through a first gasket, the first side hole, a first cam, a second cam, a first elastomer, a second gasket and is fastened by a connecting member;
a second pivoting member with a second connecting portion at one end, while the other end thereof horizontally crosses through the second side hole, a third gasket and is fastened by a fastener, the first connecting portion and the second connecting portion being connectable to a base of the electronic device;
a connecting sheet set above the brace, the connecting sheet having a sheet hole, and a third connecting portion and a fourth connecting portion each on a respective side of the connecting sheet for connecting to a display unit of the electronic device;
an angle limiter having a convex edge disposed on a sidewall thereof;
a rotation sheet having a first convex and a second convex disposed on a sidewall of the rotation sheet, such that the first convex or the second convex pushes the angle limiter to rotate after colliding with the convex edge of the angle limiter, and the angle limiter rotates with the rotation sheets until being stopped by one of the first and second stops; and a spindle with a post which crosses through a fourth gasket, a second elastomer, the brace hole, the angle limiter, the rotation sheet, a fifth gasket and the sheet hole vertically.

* * * * *